United States Patent

[11] 3,615,752

| [72] | Inventors | Jake Walter Hoffman, Jr.<br>Cincinnati, Ohio;<br>Gregory Joseph Huelsman, Wychoff, N.J. |
|---|---|---|
| [21] | Appl. No. | 856,817 |
| [22] | Filed | Sept. 10, 1969 |
| [45] | Patented | Oct. 26, 1971 |
| [73] | Assignee | Borden, Inc.<br>New York, N.Y.<br>Continuation-in-part of application Ser. No. 671,486, Sept. 28, 1967, now abandoned, which is a continuation of application Ser. No. 520,077, Jan. 12, 1966, now abandoned. |

[54] PRINTING INK
3 Claims, No Drawings

[52] U.S. Cl. .................................................. 106/27,
   106/237, 106/241, 260/24, 260/37
[51] Int. Cl. ..................................................... C09d 11/06
[50] Field of Search........................................... 106/20–32,
   218, 230, 237, 241; 260/24, 29.6, 31.2, 31.8, 26,
   27, 37

[56] References Cited
UNITED STATES PATENTS

| 2,400,519 | 5/1946 | Kroeger et al. ............... | 106/27 X |
| 2,720,461 | 10/1955 | Voet............................. | 106/27 X |
| 2,733,155 | 1/1956 | Williams et al. .............. | 106/27 X |

*Primary Examiner*—Julius Frome
*Assistant Examiner*—Joan B. Evans
*Attorneys*—George P. Maskas and Edward L. Mandell ABSTRACT: This invention relates to printing inks for use on coarse or other paper or liquid-permeable base material comprising a coloring agent and a varnish, said varnish having a PH below 7 consisting essentially of a solution in 20–100 parts by weight of a glycol solvent of (a) 100 parts by weight of acid resin plus up to 30 parts by weight of an adduct-forming acid for every 100 parts of base resin and having an acid number of at least 60 and (b) the water-soluble salt formed by reaction of the acidic resin with between about 1 to 6 parts by weight of a monomeric, water-soluble, volatile amine, the amount of amine used being equivalent to no more than 75 percent of the acidity of the resin, said solution in said solvent of said resin, amine and salt being substantially free from amide.

PRINTING INK

RELATED APPLICATIONS

This application is a continuation-in-part of Ser. No. 671,486, filed Sept. 28, 1967, entitled, "Printing Ink," which in turn is a continuation of U.S. Ser. No. 520,077, filed Jan. 12, 1966, entitled, "Printing Ink," both now abandoned.

DETAILED DESCRIPTION OF THE DISCLOSURE

This invention relates to a printing ink for use on coarse, or other paper or like liquid-permeable base material.

Inks of this general type, based on an acidic resin, have been made heretofore. Thus, wood rosin has been reacted in hot conditions with amines and the product used as the principal solid of the ink. In some cases the resin used has been an adduct of the rosin with an unsaturated dicarboxylic acid in an ink that, when printed, remains "open" for a period of 15 minutes or more.

We provide a resin and an ink containing it that will set, to the condition of feeling dry to the touch, in periods as short as 3 minutes without acceleration by either heat or steam. We have also obtained satisfactory water stability, as shown by good wet rub resistance, and a glossy print.

We have found also that these results are associated with freedom of the amine-resin salt, which we produce as the ink base, from any substantial content of amide. Contributing also is the large proportion of the original resin acid left free in the salt, this free acid increasing the range of pigments that are wetted by and are usable with the resin base ink, since by maintaining a large degree of free acid, the pH value of the resin solution is controlled below 7, allowing for use of pigments which are unstable in an alkaline medium.

Briefly stated, the invention comprises the herein described printing ink, resin-amine salt for use therein, and the process of preparing the salt.

Wood rosin reacted with 22 percent of its weight of fumaric acid, to give the adduct "22 percent Fumarated Wood Rosin" is a suitable starting resin. We dissolve it in warmed ethylene glycol, as at 150° C. We cool the resulting solution to about 40° C. and then add monoethanol amine or other amine slowly and with light agitation while maintaining the temperature of the solution and reaction mixture at all times below about 60° to 80° C., by external cooling it if necessary. The result is the formation of an amine salt as to produce any significant proportion of amide. The solution so made has a pH below 7 because of the free acids remaining. The produce is water soluble and, when printed as an ink and set, is water stable. We attribute the stability in contact with water to the substantial freedom of the salt from amide.

The resin used may be rosin, any derivative thereof or like resin. It must have an acid number of 60, and ordinarily about 60–260, and must react with the amine to give a water-soluble salt. An example of such resin that gives satisfactory results at relatively low cost is the fumarated wood rosin described above. Other adducts, made by heating ethenoid bond-reactive resins with polycarboxylic aliphatic acids may be used. These include the following examples that illustrate the class: adducts of wood rosin, hydrogenated rosin or polymerized rosin with fumaric, maleic, citraconic, itaconic and like alpha, beta-unsaturated polycarboxylic acids. The anhydrides are suitably introduced in the reaction instead of the acids themselves, and the adduction is effected by the well-known process.

The amine which neutralized a part of the resin acid, either of the rosin itself when used or of the adduct of the kind described, is one which gives with such acid a salt that is soluble in water. Because of the limited proportion in which the amine is used, it is not necessary that it be rapidly volatile; the printed ink sets without hydrolysis of the amine-resin salt to acid and free amine and the evaporation of the latter. The amine used is one which has a constant of ionization as a base ($K_b$) at room temperature that is less than $1 \times 10^{15}$. Examples are the alkanol amines including, for example, mono-, di-, or triethanol, ethanol or isopropanol amines and also the corresponding mono-, di- and triamines such as methyl, ethyl and isopropyl. In any case, the amine must be soluble in water and must give a water-soluble salt when reacted with the acids of rosin or other resin selected.

The reaction of the resin with the amine is effected in a solvent for the amine, the resin and the salt produced. Solvents that we use are hydrophylic liquid organic compounds, e.g., mono, di or tri $C_{2-14}$ glycols, glycerol, pentaerythritol and like water-soluble $C_{1-13}$ alkyl ethers and esters thereof, such as monomethyl, ethyl or propyl ether of glycol or the mono-, di-, or triacetate of glycerol. The solvent selected should be a solvent for the reactants and the resulting amine salt and be chemically inert therewith.

The following table shows the recommended proportions and illustrative amounts that can be used in producing out printing ink.

| Material Used | Parts by Weight | |
|---|---|---|
| | Recommended | Illustrative |
| Wood rosin or other resin | 100 | 100 |
| Fumaric or like adduct-forming acid | 10–25 | 0–30 |
| Amine | 2–5 | 1–6 |
| Solvent, e.g., glycol | 25–75 | 20–0 |

Use of the adduct-forming acid in amounts in excess of that which can combine with the resin is not recommended.

The amount of amine used should not exceed, for best results, that equivalent to three-fourths of the acidity of the resin and preferably it should not exceed that equivalent to 45 percent of the acidity of the resin.

Proportions of the materials used are so selected within the ranges stated that the pH of the resulting solution will, in all cases, be approximately 6.8 or lower.

The amine and resin to be reacted therewith are mixed in the usual manner into the solvent and are suitably agitated during the succeeding reaction.

A critical feature of the process is controlling the temperature of the reaction mixture and the resulting amine salt never reach a temperature at which the salt is converted in significant amount to the corresponding amide. To avoid this conversion, we maintain the amine salt, at all times during its formation and thereafter, up to and including the time of printing with the ink, at a temperature below that of decomposition of the specific amine salt present to amide. This is ordinarily below 60° or below 80° C. with certain salts of our class, particularly when the time of exposure to the elevated temperature is reduced.

Once the reaction of the amine and the resin acids is completed, as shown by cessation of development of heat from the exothermic reaction, the solution so made is ready for compounding into the finished ink. For this purpose there are stirred into the solution the conventional additional components of the printing inks, as, for example, the pigment, an extender of the pigment and, at times, a wax to provide additional gloss to the printed ink.

Examples that illustrate the class of pigments are Methyl Violet (dimethylaniline-phosphomolybdic acid), Chrome Yellow (lead chromate with lead sulfate), Calcium Lithol (Calcium slat of Tobias acid coupled with beta naphthol), Opaque White (titanium dioxide), Phthalo Cyanine Blue (copper phthalocyanine), Milori Blue (ferric ferrocyanide), and Moly Orange (mixed crystals of lead sulfate, lead chromate, and lead molybdate).

As an extender we ordinarily use finely divided, dry clay or Blanc Fixe (barium sulfate).

Suitable waxes are microcrystalline wax, polyethylene wax and paraffin wax.

The invention is further illustrated by the following examples, proportions here and elsewhere herein being expressed as parts be weight.

EXAMPLE 1

A resin-amine salt solution for use in making the ink was first prepared.

One hundred parts of 22 percent fumarated wood rosin of acid No. 250–260 was stirred into 62 parts of ethylene glycol at 150° until dissolved. The solution was then cooled to 38° C. and mixed, with light agitation, with 4.2 parts of monoethanolamine. The amine was introduced slowly, so that the temperature never rose to 60°. The amine used was calculated to neutralize 11.2 percent of free acid.

The glycol dissolved the reactants as well as the amine salt which was formed, the pH of the solution was 6.8 and the salt was substantially free from amide, the amine salt being converted to the extent of less than 0.5 percent to the amide.

EXAMPLE 2

The solution of the salt made in example 1 was compounded into printing inks by admixing the following components in the proportions shown, at approximately room temperature:

INKS*

|  | A | B | C | D | E |
|---|---|---|---|---|---|
| Resin-amine salt solution of example 1 | 55.0 | 39.0 | 32.0 | 42.50 | 41.5 |
| Aluminum silicate | 15.0 | 17.9 |  |  |  |
| Barium sulfate |  |  |  | 6.85 | 9.0 |
| Ethylene glycol | 15.0 | 14.0 | 14.0 | 19.00 | 14.4 |
| Triethylene glycol |  |  |  |  | 3.0 |
| Polyethylene wax (mol. wt. 2,000) | 5.0 |  |  |  |  |
| Micro crystalline wax |  | 3.0 | 3.0 | 3.00 | 3.6 |
| Red Lake C pigment | 10.0 |  |  |  |  |
| Titanium Dioxide |  | 5.2 | 8.0 | 11.10 | 7.0 |
| Calcium Lithol |  |  |  | 9.25 | 8.0 |
| Chrome Yellow |  | 18.0 | 43.0 |  |  |
| Molybdate Orange |  | 2.9 |  | 8.30 | 13.5 |
| Total | 100.0 | 100.0 | 100.0 | 100.00 | 100.0 |

* Components of each ink are in parts by weight.

The resulting inks were fast setting and had good wet rub resistance. The salt component was dissolved in the ethylene glycol; the insoluble matter was finely dispersed in the solution, as the liquid phase.

The Red Lake C pigment may be any one of the commercial forms from the group defined in Rose, "Chemical Dictionary," 6th Ed., e.g., the barium salt.

EXAMPLE 3

The procedure and composition of example 1 are used except that the ethylene glycol is replaced by an equal weight of triethylene glycol.

EXAMPLE 4

The procedure and composition of example 1 are used except that the 22 percent fumarated wood rosin is replaced, separately and in turn, by an equal weight of adducts of wood rosin, hydrogenated rosin, and polymerized rosin with fumaric, maleic, citraconic, and itaconic acids; the proportion of acid in the adduct varying from about 10 percent to about 30 percent by weight. Equally comparable results are obtained when these varnishes are used to make inks as set forth in example 2.

It will be understood that it is intended to cover all changes and modifications of the examples of the invention herein chosen for the purpose of illustration which do not constitute departures from the spirit and scope of the invention.

What is claimed is:

1. A fast-setting printing ink comprising a pigment and a varnish, said varnish having a pH below 6.8 consisting essentially of a solution, in 200 to 100 parts by weight of a glycol solvent, of the water-soluble salt formed by reacting at a temperature below 80° C.: (a) 100 parts by weight of an acidic resin selected from the group consisting of wood rosin, hydrogenated rosin and polymerized rosin plus up to 30 parts by weight of an adduct forming acid for every 100 parts of resin and having an acid number of at least 60; with (b) between about 1 and 6 parts by weight of a monomeric, water-soluble, volatile amine, the amount of amine used being equivalent to no more than 45 percent of the acidity of the resin, said salt being substantially free of amide groups.

2. The printing ink of claim 1, wherein the liquid organic solvent is ethylene glycol and the amine is ethanolamine.

3. An ink of claim 1 wherein: the salt is formed at a temperature below 60° C.: the organic solvent is 25–75 parts by weight of ethylene glycol and the amine is 2–5 parts be weight of ethanolamine.